United States Patent [19]
Hamersley et al.

[11] Patent Number: 6,046,684
[45] Date of Patent: Apr. 4, 2000

[54] SINGLE BUTTON CONTRAST CONTROL

[75] Inventors: Richard A. Hamersley, Wooster, Ohio; Mark F. Pleso, Sharon, Pa.; Lee E. Leppo, Tallmadge, Ohio

[73] Assignee: Telxon Corporation, Akron, Ohio

[21] Appl. No.: 08/862,562

[22] Filed: May 23, 1997

[51] Int. Cl.⁷ .................................................. G08C 19/00
[52] U.S. Cl. ........................ 340/825.69; 340/825.72; 455/151.4
[58] Field of Search .................. 340/825.69, 825.72, 340/825.12, 825.24; 455/151.4, 151.2; 345/158, 169, 173; 348/734

[56] References Cited

U.S. PATENT DOCUMENTS

| | | |
|---|---|---|
| 4,229,765 | 10/1980 | Sanger . |
| 4,385,204 | 5/1983 | Wine . |
| 4,796,019 | 1/1989 | Auerbach ................................ 340/709 |
| 5,201,068 | 4/1993 | Kawashima . |
| 5,422,656 | 6/1995 | Allard et al. . |
| 5,542,103 | 7/1996 | Mottier et al. . |

*Primary Examiner*—Brian Zimmerman
*Assistant Examiner*—Anthony A. Asongwed
*Attorney, Agent, or Firm*—Amin, Eschweiler & Turocy, LLP

[57] ABSTRACT

A single button contrast control which can bi-directionally adjust a contrast function in one of two directions so as to increase or decrease the contrast of a display. An interrupt generator generates an interrupt for each user activation of a single button control key. A control circuit incrementally adjusts the contrast function in accordance with the interrupts generated. If no interrupts are generated within a predetermined period of time following a previous interrupt, the control circuit changes the direction in which the contrast is incrementally adjusted so that the next time a user activates the single button control key the control will be adjusted in the other direction.

16 Claims, 4 Drawing Sheets

SINGLE BUTTON CONTRAST CONTROL

TECHNICAL FIELD

The present invention relates generally to switching devices, and in particular to a single button switch for use in bi-directionally controlling a function of a computing device.

BACKGROUND OF THE INVENTION

In recent years, the use of wireless communication systems having mobile transceivers which communicate with a hardwired network, such as a local area network (LAN) or a wide area network (WAN), has become widespread. The mobile transceivers, commonly referred to as mobile terminals, may take one of several different forms. For instance, in retail stores hand-held scanning units may be used to allow for scanning inventory bar codes. In a warehouse, portable units mounted to a vehicle may be used to gather information from the warehouse floor. In a medical environment, the mobile terminal may take the form of a pen based workslate which allows medical personnel to work with full page screens.

In a typical wireless communication system, each mobile terminal communicates with a networked system via a radio or optical link in order to allow for a real time exchange of information. The mobile terminals communicate through one of several base stations interconnected to the network. The base stations allow for a wireless data communication path to be formed. Consequently, such mobile terminals significantly facilitate worker efficiency since data can be gathered, transmitted and even processed at a remote site in real time.

However, despite the aforementioned advantages associated with mobile terminals, there is a strong need for a more ergonomic mobile terminal. For example, with the widespread use of computers, portable digital assistants, and the like there is an ongoing struggle to enhance display systems to allow for user friendly viewing of information on the screen. One standard feature available on many electronic devices to accommodate user friendly viewing is a contrast control. The contrast control allows a viewer to lighten or darken the display screen to adjust for current ambient lighting conditions. For instance, on particularly sunny days a viewer of a display screen may choose to darken the screen to allow for easier readability. Alternatively, as the day gets darker the viewer may choose to lighten the screen.

Furthermore, many such mobile terminals have liquid crystal displays (LCDs) and as they are moved from one point to another the LCD may be exposed to temperature variances which affect the LCD contrast. For example, extreme cold renders the liquid crystal material opaque and extreme heat renders the material transparent. Consequently, some form of contrast control is required to compensate for the effects of temperature variances on the liquid crystal display.

To adjust the contrast control, manufacturers of electronic devices (including mobile terminals) typically include two easily accessible contrast control buttons. One of the contrast control buttons would be used for darkening the screen and another of the contrast control buttons would be used to lighten the screen. As opposed to using buttons, there have also been electronic devices made with rotatable knobs and sliding controls which provide for similar functionality. For instance, by either turning or sliding such a control, the contrast on the screen would adjust appropriately.

One area of growing popularity in the computer industry is the use of wireless pen based computer systems. Such computers are used by workers in warehouses and on manufacturing floors as well as outdoors by postal workers, utility servicemen, etc. Given the environment in which such mobile terminals are often utilized, it is not beneficial to provide a contrast control feature which uses rotatable or sliding controls since such controls are prone to breaking and often provide an inlet where rain or other moisture is able to seep into the computer and damage internal wiring. Buttons are more durable and easier to secure from moisture, however, since two buttons are needed this often takes up a significant portion of valuable space on the mobile terminals control panel. This is especially true of mobile terminals built for ruggidized outdoor activity since each button on the portable computer is oversized and spaced apart to allow for easy management by individuals who may be wearing gloves or the like.

The portability of these computing devices places demands on reduction of size. In order to meet this demand, it is desired to optimize the key board arrangement of such devices so as to optimize space. A single button switch is known in the art for bi-directionally controlling volume. However, there are deficiencies associated with this conventional switch. In particular, the switch must be continuously depressed in order to increase or decrease the volume. Once the button is released, the volume direction is changed so that the next time the button is pushed the volume moves in the opposite direction. A problem with such a design is overshoot and undershoot of a desired function level. For example, if a user desires to increase the volume he/she must keep the button depressed. If the button is pressed too long, the volume is set to be excessively louder than desired. If the button is not pressed down long enough the volume is too low. In the case where the button is not pressed down long enough, the next time the user pushes down the button the volume is further reduced. Consequently, fine tuning of the volume is not achieved as easily as if two buttons were available (one for each direction of change in volume).

Thus, in light of the above, there is a strong need for a single button switch which can accomplish substantially the same amount of functions that can be accomplished conventionally with two switches and avoid the problems associated with conventional single button switches. In particular, there is a need in the art for a contrast control feature which does not have the limitations described above. More specifically, there is a need for a single button contrast control feature which is durable, easy to seal, requires a minimum amount of space, and affords for fine tuning a function easily.

SUMMARY OF THE INVENTION

The present invention describes a single button control system which overcomes the shortfalls described above with known function control techniques. In particular, the present invention is directed to a single button contrast control which can bi-directionally adjust a contrast function in one of two directions so as to increase or decrease the contrast of a display. An interrupt generator generates an interrupt for each user activation of a single button control key. A control circuit incrementally adjusts the contrast function in accordance with the interrupts generated. If no interrupts are generated within a predetermined period of time, the control circuit changes the direction in which the contrast is incrementally adjusted so that the next time a user activates the single button control key the control will be adjusted in the other direction.

In accordance with one particular aspect of the present invention, a switching system is provided, including: a user activated switch for shifting among a plurality of levels, the shifting occurring in accordance with one of a first state and a second state, and the switch operable to switch between the first state and the second state; a control circuit operative to receive a signal from the switch; wherein the signal from the switch generates an interrupt in the control circuit so as to trigger the control circuit to effect shifting among the plurality of levels.

According to another aspect of the present invention, an electronic device is provided, including: a user activated switch for selectively controlling at least one function of the electronic device, the function having a plurality of function levels, the at least one function having a first direction state and a second direction state; and a control circuit operative to receive a signal from the switch, the control circuit controlling the plurality of function levels in accordance with the signal from the switch, and wherein the control circuit shifts from the first direction state to the second direction state following inactivity of the switch for a predetermined period of time.

In accordance with another aspect of the present invention, a portable computing device having a single button function control, comprising: a portable housing; a control circuit within the housing, the control circuit including a user programmable processor; a display visible through an opening in said housing; at least one single button control key coupled to the control circuit for selectively controlling at least one function of the portable computing device, the at least one function having a first direction state, a second direction state, and a plurality of function levels, the control circuit operative to receive a signal from the at least one single button control key, the control circuit controlling a plurality of function levels in accordance with the signal from the at least one single button control key, and wherein the control circuit shifts from the first direction state to the second direction state following inactivity of the switch for a predetermined period of time.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
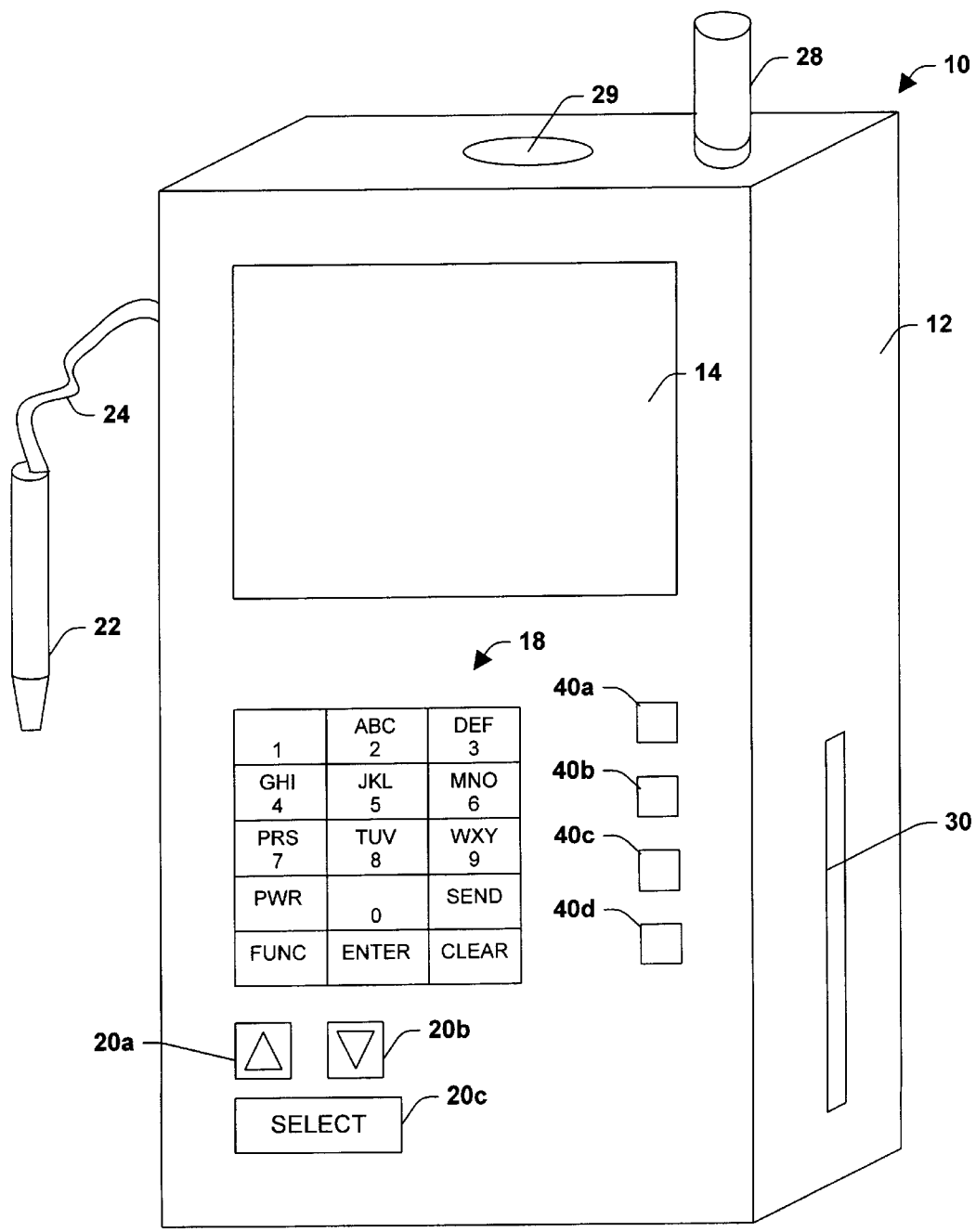
FIG. 1 is a perspective view of a mobile terminal having a single button contrast control switch in accordance with the present invention.

The present invention will now be described with reference to the drawings, wherein like reference numerals are used to refer to like elements throughout.

As is mentioned above, the present invention relates to a single button control system which overcomes the shortfalls described above with known function control techniques. In particular, the present invention is directed to a single button contrast control which can bi-directionally adjust a contrast function in one of two directions so as to increase or decrease the contrast of a display. An interrupt generator generates an interrupt for each user activation of a single button control key. A control circuit incrementally adjusts the contrast function in accordance with the interrupts generated. If no interrupts are generated within a predetermined period of time, the control circuit changes the direction in which the contrast is incrementally adjusted so that the next time a user activates the single button control key the control will be adjusted in the other direction. The use of interrupts to handle a single button control feature has advantages over non-interrupt driven systems given the reduced need for digital logic circuitry and since they are easily configurable with existing interrupt driven functionalities of a device.

The present invention will now be described with reference to the drawings wherein like reference numerals are used to refer to like elements throughout.

As is mentioned above, the present invention relates to a programmable mobile terminal (e.g., a portable teletransaction computing device (PTC)) in which a single button switch is used to bi-directionally control a function (e.g., the contrast of a display) of the PTC. In the exemplary embodiments described hereinafter, each PTC is a hand held inventory control device used to communicate data such as inventory or the like within a cellular, narrow band or other radio communication system including multiple mobile terminals and base stations. However, it is recognized that the present invention contemplates other types of programmable mobile terminals or devices and portable computers and is not intended to be limited necessarily to hand held inventory control devices or devices which must wirelessly communicate information.

Referring initially to FIG. 1, a mobile terminal 10 is shown in accordance with the present invention. The terms "mobile terminal", "PTC" and "portable computer" are used interchangeably throughout the specification. The mobile terminal 10 includes a portable housing 12 which is preferably made of metal, high strength plastic, or the like. The mobile terminal 10 includes a display 14 such as a liquid crystal display (LCD) or the like. In the preferred embodiment, the display 14 is a fine pitch liquid crystal display operated as a standard CGA display with a resolution of 640×200 pixels. As is conventional, the display 14 functions to display data or other information relating to ordinary operation of the mobile terminal 10 in a cellular communication system. For example, the display 14 may display inventory information, pricing detail, etc. which is to be transmitted to or is received from a system backbone. Additionally, the display 14 may display a variety of functions that are executable by the mobile terminal 10. The display 14 is capable of displaying both alphanumeric and graphical characters.

The mobile terminal 10 further includes an operator input device 18 in the form of a key pad which enables a user to enter data, information, function commands, etc. as is conventional. For example, the user may input information relating to inventory via the keypad 18 for subsequent transmission to a base station (not shown). In addition, the keypad 18 includes up and down cursor keys 20a and 20b, respectively, for controlling a cursor which may be shown on the display 14. By selectively pressing the up and down cursor keys 20a and 20b, the user is able to move the cursor about the display 14. Furthermore, the key pad 18 includes a select key 20c for selecting an item or function designated by the cursor.

The mobile terminal 10 also includes a bar code reader 22 in the form of a wand or the like which allows information to be input to the mobile terminal 10 via bar code symbols. The bar code reader 22 is coupled to the housing 12 by a cable 24 which provides the appropriate electrical connections between the bar code reader 22 and the circuitry contained in the housing 12.

Extending from the housing 12 is an antenna 28 for transmitting and receiving radio signals within a cellular communication system. In the exemplary embodiment, the antenna 28 is an omnidirectional antenna but other types of antennas may equally be used. A speaker 29 is integral to the housing 12 and provides an audial output for the user. Additionally, the mobile terminal 10 includes a PCMCIA card slot 30 for receiving a PCMCIA card. As mentioned above, the mobile terminal 10 is user programmable and thus a user can input commercial or user created software to tailor the mobile terminal 10 to execute desired functions. However, it is understood that this invention is not limited to inputting functions, instructions or data via a PCMCIA card, and that any suitable means for a user to input functions, instructions or data to the mobile terminal 10 falls within the scope of the this invention.

Information may be entered into the mobile terminal 10 in a number of different manners. For instance, information may be entered through the bar code reader 22, the keypad 18, or even through the display screen 14. Further, a series of push button input keys 40a–d are also available to perform certain specified operations. For instance, in the present embodiment, input key 40a is for contrast control, input key 40b is to place the mobile terminal 10 into a power savings suspend mode, input key 40c is used to toggle a back light to the display screen 14, and input key 40d serves as a right mouse button to provide for extra functionalities when working in a Windows (TM) environment on the mobile terminal 10. It will be appreciated that a thumb wheel (not shown) could be employed in lieu of the mouse to provide for extra functionalities. The push button keys 40a–d in the preferred embodiment are spring loaded, however, any suitable type of mechanical and/or electrical key may be employed to carry out the present invention.

Figure 2:
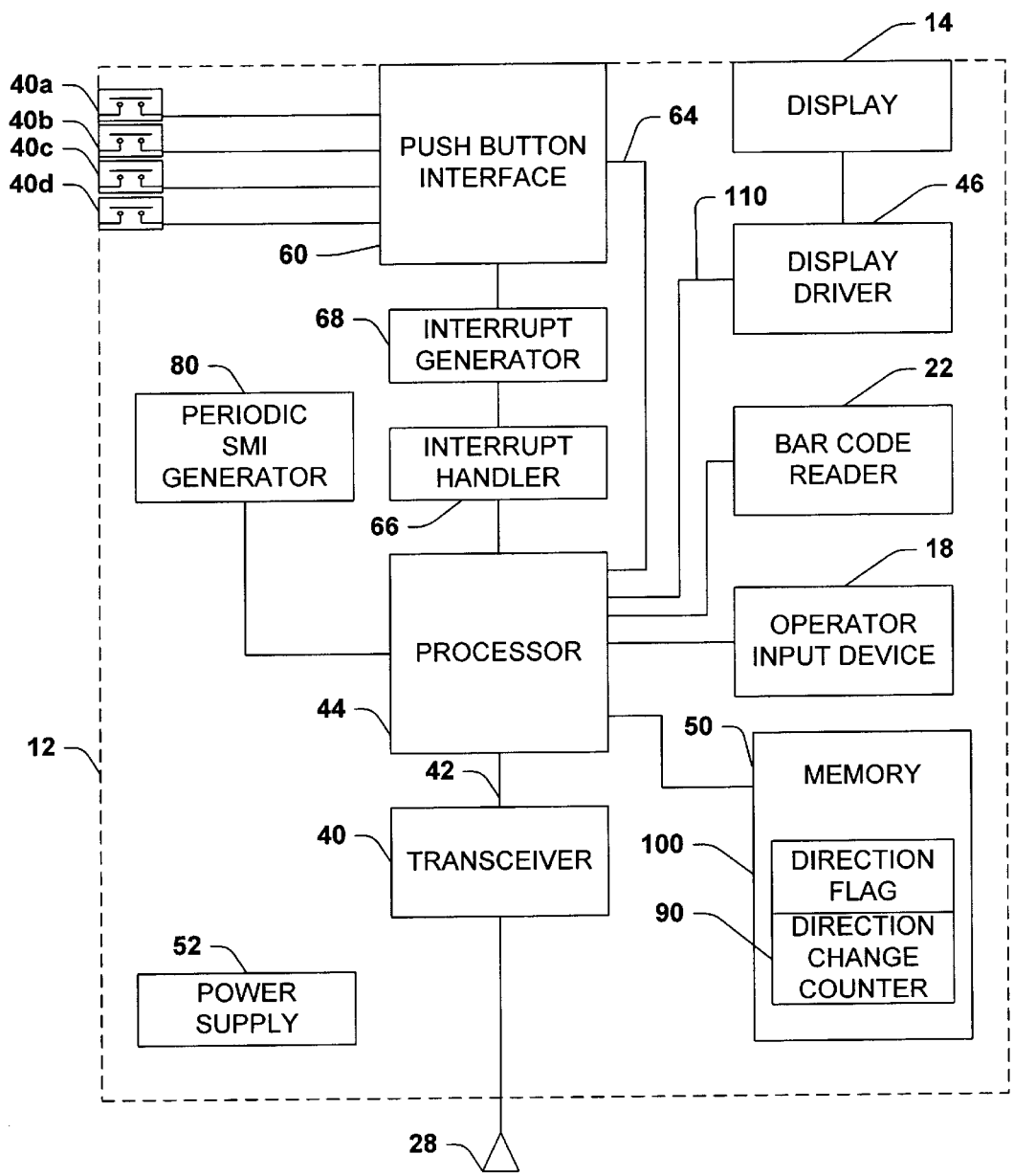
FIG. 2 is a block diagram of a mobile terminal in accordance with the present invention.

Referring now to FIG. 2, a block diagram of the electronic circuitry within the mobile terminal 10 is shown. As noted above, the mobile terminal 10 includes an antenna 28 for receiving and transmitting signals via a transceiver 40 to which it is connected. The transceiver 40 is coupled via a control/data bus 42 to a processor 44 included in the mobile terminal 10. The processor 44 is responsible for controlling the general operation of the mobile terminal 10 with respect to processing and storing information received and transmitted by the transceiver 40. The processor 44 is programmed to control and to operate the various components within the mobile terminal 10 in order to carry out various functions described herein. The operator input device 18 is coupled to the processor 44 which allows an operator to input data to be communicated to a system backbone (not shown) or local computer (not shown) such as inventory data, ordering information, and the like. The input device 18 can include such items as the aforementioned keypad, touch sensitive display, etc. The mobile terminal 10 also includes the bar code reader 22 coupled to the processor 44 for providing another form of data input.

The display 14 is connected to and controlled by the processor 44 via a display driver circuit 46. A memory 50 is included in the mobile terminal 10 for storing program code executed by the processor 44 for carrying out operating functions of the mobile terminal 10 as described herein. The memory 50 may also serve as a storage medium for temporarily storing information received from or intended to be transmitted to a base station (not shown) or a local computer (not shown). The memory 50 includes various memory areas and system resources. These various memory areas include a main memory, a nonvolatile memory or Boot ROM, an extended memory, an expanded memory, and battery backed random access memory (typically implemented as a complementary metal oxide semiconductor device or CMOS device).

Main memory is the normal random access memory which is used by both applications and systems software of the mobile terminal 10. Main memory includes a system management area comprising a segment of isolated random access memory. The system management area may only be accessed while the processor 44 is in a system management interrupt state. As will be discussed in greater detail below, the system management interrupt state is entered upon the occurrence of a system management interrupt. The remaining portions of main memory are freely accessible (i.e., non-isolated) by any interrupt or noninterrupt processing logic.

A power supply 52 is also included in the mobile terminal 10 for providing power to the various components of the mobile terminal 10 as is conventional. The power supply 52 may be in the form of a battery and/or connectable to an external power source such as a wall outlet.

With the exception of the antenna 28, the components making up the mobile terminal 10 are preferably housed in a palm-sized housing 12 represented in phantom. This makes the mobile terminal 10 highly portable and easy to carry from one cell to another within a cellular system.

Also coupled to the processor 44 through a push button interface 60 are the input keys 40a–40d. The push button interface 60 serves as a debouncer for the input keys 40a–40d and provides the processor 44 with an address signal along line 64 which the processor 44 monitors so as to determine when and which of the input keys 40a–40d has been pressed. Also coupled to the processor 44 via an interrupt handler 66 is a push button interrupt generator 68.

The push button interrupt generator 68 generates an interrupt signal to the processor 44 each time an input key 40a–40d is pressed so that the processor 44 knows when to check the address on line 64. Until a push button interrupt is sent to the processor 44, the processor 44 does not investigate the status of the input keys 40a–40d via line 64 and thus any inputs through these keys would be ignored without the push button interrupt generator 68. The signal on line 64 will vary in accordance with the particular input key 40a–40d pressed. In the preferred embodiment, the processor 44 discriminates between which input key 40a–40d by the voltage level of the signal on line 64. However, any suitable means for allowing the processor 44 to determine which key is being pressed may be used to carry out the present invention.

Independent of the push button interrupt generator 68, but also coupled to the processor 44, is a periodic system management interrupt (SMI) generator 80. The purpose of the SMI generator 80 is to effect continuous, systematic interrupts to the processor 44 for the purpose of maintaining a direction change counter (DCC) 90 discussed below. System management interrupts differ from most other types of interrupts in that they are completely independent of the application program running on the mobile terminal 10. Thus, even if new software is loaded to the mobile terminal 10 or if the mobile terminal 10 is configured with a new operating system, the SMI generator 80 will independently continue to assert its system management interrupts to the processor 44. Accordingly, system management routines may be prompted for execution at a programmable rate with minimal system overhead. In the preferred embodiment, the SMI generator 80 is set to trigger an interrupt every ⅛th of a second. However, it will be appreciated that any suitable frequency of interrupt generations may be employed to carry out the present invention, and fall within the scope of the present invention as recited in the claims.

The memory 50 which is coupled to the processor 44 includes memory locations for both a direction flag 100 and the direction change counter 90. As will be discussed below in conjunction with FIG. 3, the direction change counter 90 is loaded with its full value each time the contrast input key 40a is pressed (see step 210). The direction change counter 90 sets a time limit that a user pressing the contrast input key 40a may pause. If the user pauses between pressing the contrast input key 40a for more then the time limit afforded (as governed by the combination of the direction change counter 90 and the periodic SMI generator 80), the direction flag 100 will toggle the direction the contrast is adjusted. In other words, if the contrast key 40a is not pressed within the time limit (e.g., 1 second), the direction flag 100 will switch the direction the contrast is being adjusted. For example, if a user is incrementally increasing (e.g., brightening) contrast by repeatedly pressing the contrast button 40a, and then does not press the contrast button for the time limit (e.g., 1 second), the direction flag 100 will toggle and switch the direction of the contrast function. Thus, when the user presses the contrast key 40a again, the contrast will decrease (e.g., darken) as the contrast key 40a is pressed. If the user thereafter pauses again for a period of time exceeding the limit, the direction flag 100 will toggle again to switch the direction so that contrast is increased as key 40a is pressed. This process is repeated continuously after the mobile terminal 10 has been activated and the contrast key 40a has been pressed at least once.

In particular, a typical value for the direction change counter 90 may be seven or eight, thereby giving the user adjusting the contrast a one second total allowable pause time before the direction flag 100 is toggled assuming the periodic SMI generator 80 generates an interrupt every ⅛th of a second. As an example, a user desiring to adjust the contrast of the display 14 would begin by pressing and depressing the contrast input key 40a. If the person wished to continue adjusting the contrast in the same direction, he/she would have to again press the contrast input key 40a in less then the one second time interval preset. Adjustment in the same direction would continue to occur as long as the contrast input key 40a was pressed and depressed in less then the one second time. If, however, the person paused for over one second before again pressing the contrast input key 40a, the direction flag 100 will have toggled thereby resulting in the contrast adjusting in the opposite direction. From this point on the contrast will continue adjusting in this new direction until a pause of over one second is sensed between pressings of the contrast input key 40a.

Finally, the display 20 is shown coupled to the processor 44 through a display driver 46. The display driver 46 includes a digital to analog (D/A) converter (not shown). The contrast of the display 14 is governed by the value of a four bit binary value input to the display driver 46 via line 110. A representative analog value is output from the display driver 46 to the display 20 via line 116 which controls the contrast level of the display 14. The method in which the contrast of the display 14 is adjusted is well known in the art and follows conventional techniques.

Figure 3:
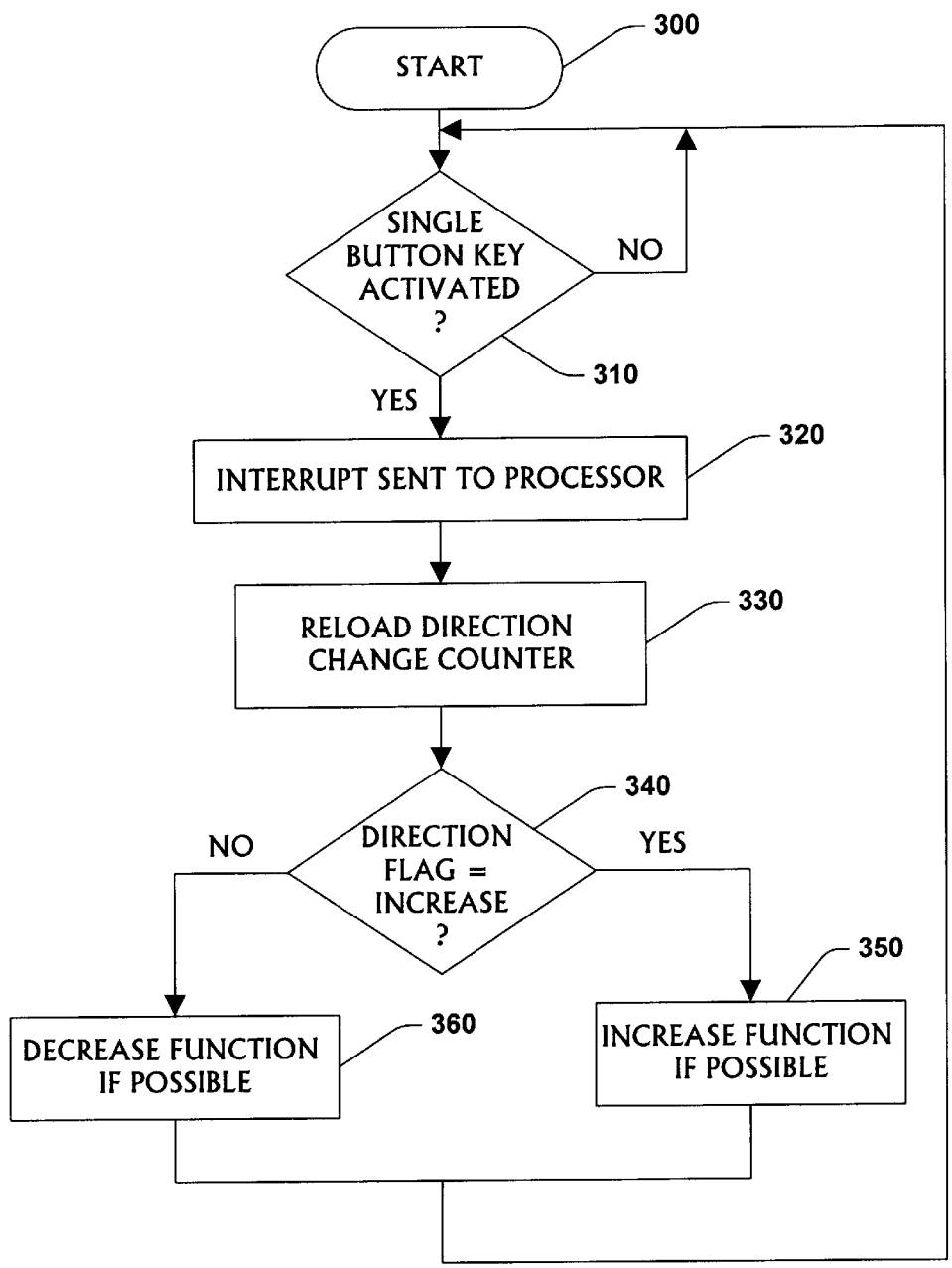
FIG. 3 is a system flowchart suitable for programming the mobile terminal to adjust contrast bi-directionally via a single button contrast control switch in accordance with the present invention.

FIG. 3, is an overall block diagram of the operations of the mobile terminal 10 with respect to adjusting the contrast level of the display 14 in accordance with the present invention. Beginning in step 300, the processor 44 starts power-on and general initializations as part of the overall initializations of the mobile terminal 10. Such initializations are conventionally known and are not further discussed for sake of brevity. In step 310, the interrupt generator 68 passively monitors the mobile terminal 10 for any pressing of the contrast key 40a. It will be appreciated that the interrupt generator 68 monitors for the pressing of other keys such as 40b–40d. If the contrast key 40a has not been pressed, the processor 44 returns to step 310. If the interrupt generator 68 determines that the contrast key 40a has been pressed, it sends in interrupt to the processor 44 in step 320. Upon sensing that the contrast input key 40a is pressed, the processor 44 proceeds to step 330 where it reloads the direction change counter 90 in memory 50 with a preset value. In the preferred embodiment, the preset value is eight, thereby providing that any pause for more than one second will result in the direction flag 100 being toggled. As was mentioned above, the periodic SMI generator 80 will generate a system management interrupt every ⅛th of a second. Since each SMI interrupt decrements the DCC 90 by one, the DCC will reach 0 after 1 second passing where the contrast key 40a is not activated. It is noted that upon start up, the direction flag is preloaded with a default "increase" value while the direction change counter is set to zero at start up.

Following step 330, the processor 44 advances to step 340 where it determines which direction the direction flag 100 is currently set. If the direction flag 100 is set to increase, the processor 44 goes to step 350 where the contrast of the display 14 is adjusted one increment to increase if possible. In some cases it may not be possible to increase the contrast of display 14 since a maximum contrast value may already have been reached. Alternatively, if it is determined in step 340 that the direction flag 100 is not set to "increase", then the direction flag 100 must be set to "decrease" and the processor 44 moves instead to step 360. In step 360 the processor 44 decreases the contrast on the display screen 14 by one increment if possible. Finally, after either step 350 or step 360 is completed, the process is returned to step 310.

Figure 4:
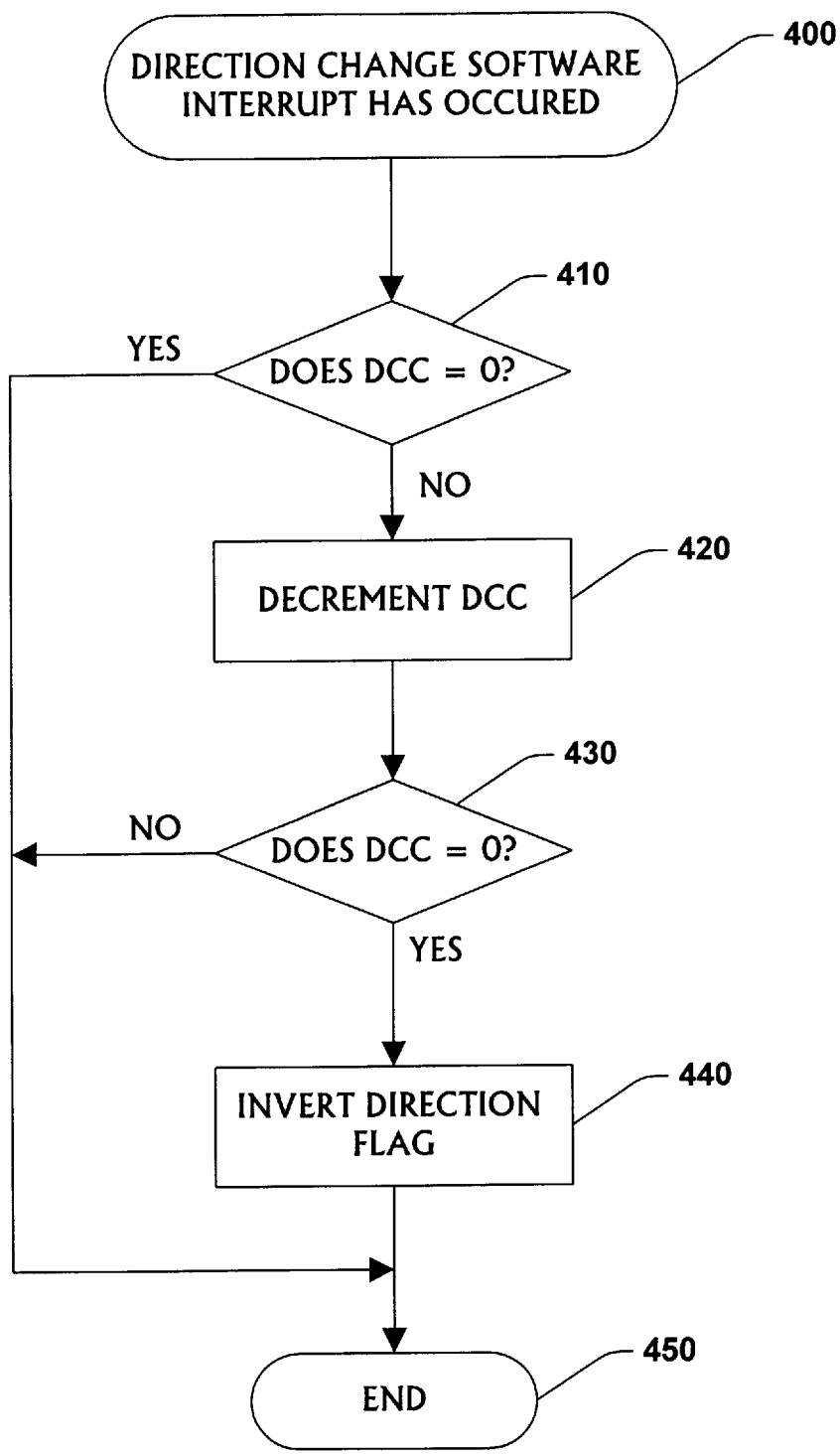
FIG. 4. is a system flow chart for switching a function direction in accordance with the present invention.

FIG. 4 shows the operations which govern the direction of the direction flag 100. In step 400, the processor 44 determines if an SMI interrupt is generated by the periodic SMI generator 80. As discussed above, the period SMI generator 80 in the preferred embodiment is set to trigger eight times every second. If an SMI interrupt is detected by the processor 44, the processor 44 proceeds to step 410 where the processor determines if the direction change counter (DCC) 90 equals zero. If in step 410 the DCC 90 equals zero then that indicates that there has been no activity with respect to the contrast input key 40a being pressed recently, and thus the processor 44 moves to step 450 and ends the routine. Note that if the contrast input key 40a had been pressed recently, then the DCC 90 would have been loaded with the value eight in step 330 (FIG. 3), as discussed above. If, in step 410 the DCC 90 is not zero, then the processor 44 in step 420 decrements the DCC 90 by one and continues to step 430. In step 430, the processor 44 again checks if the DCC equals zero. If it does not, the processor 44 simply ends this routine by proceeding to step 450. If the DCC 90 does equal zero then the processor 44 continues to step 440 where the direction flag 100 is toggled. After step 440, the processor 44 ends the routine in step 450.

The present invention via the system interrupts affords for incrementally moving along a direction of a particular function (e.g., contrast control). As a result, a user is able to fine tune a particular function with ease. For example, by way of the present invention, a user could push the contrast control key 40a until a desired level of contrast is reached. By allowing a user to incrementally move along a direction of a function with each push of the key 40a, the present invention makes fine tuning of the function much easier as compared to conventional devices. In other words, since a user is not required to keep the key 40a continuously pressed in order to move along a direction of the function there is a reduced occurrence of undershoot and overshoot. By integrating each push of the key 40a with an incremental change of the function, the user of the present invention has a sufficient amount of time in order to fine tune the subject function to a desired level. There is practically no chance for undershoot with the present invention since the user is provided an adequate amount of time (e.g., 1 second) in which to press the key 40a in order to increment the function.

Even if there was an overshoot of a function, the overshoot would be minimal (likely only one increment) and the user would not only have to wait a very brief period of time (e.g., 1 second) in order to for the direction flag 100 to toggle the function direction to change.

Although the present invention has been primarily described with respect to a single button contrast control, it will be appreciated that the present invention may be applied to a variety of functions in connection with a computing device. For example, the present invention could be used to control the volume or brightness of a computing device in much the same manner as was described above in controlling contrast of the display 14. Thus, it is to be understood any functions which conventionally require two directional buttons for bi-directionally incrementing the function and which can be accomplished with the single button control of the present invention, fall within the scope of the subject invention as recited in the claims.

Further, although the preferred embodiment describes the single button control feature of the present invention to be used in conjunction with mobile devices, it will be appreciated that the single button control feature can be used with any device including standard desk top computers.

The present invention includes all such equivalents and modifications, and is limited only by the scope of the following claims.

What is claimed is:

1. An electronic device, comprising:
    a user activated switch for selectively controlling at least one function of the electronic device, the function having a plurality of function levels, the at least one function having a first direction state and a second direction state; and
    a control circuit operative to receive a signal from the switch, the control circuit controlling the plurality of function levels in accordance with the signal from the switch, and wherein the control circuit shifts from the first direction state to the second direction state following inactivity of the switch for a predetermined period of time.

2. The electronic device of claim 1, wherein the electronic device is a mobile terminal.

3. The electronic device of claim 1, wherein the control circuit further includes an interrupt generator for generating an interrupt in response to activation of the switch.

4. The electronic device of claim 3, wherein the control circuit requests a shift of one function level for each interrupt generated.

5. The electronic device of claim 1, wherein the control circuit further includes a system management interrupt generator for generating continuous periodic system management interrupts.

6. The electronic device of claim 5, wherein the control circuit further includes a direction change counter, the direction change counter being decremented in accordance with the system management interrupt being generated.

7. The electronic device of claim 6, wherein the control circuit shifts from the first direction state to the second direction state upon the direction change counter being decremented to a predetermined value.

8. The portable computing device of claim 1, wherein the at least one function is contrast control.

9. The portable computing device of claim 1, wherein the at least one function is volume control.

10. The portable computing device of claim 1, wherein the at least one function is brightness control.

11. A portable computing device having a single button function control, comprising:
    a portable housing;
    a control circuit within the housing, the control circuit including a user programmable processor;
    a display visible through an opening in said housing;
    at least one single button control key coupled to the control circuit for selectively controlling at least one function of the portable computing device, the at least one function having a first direction state, a second direction state, and a plurality of function levels, the control circuit operative to receive a signal from the at least one single button control key, the control circuit controlling a plurality of function levels in accordance with the signal from the at least one single button control key, and wherein the control circuit shifts from the first direction state to the second direction state following inactivity of the switch for a predetermined period of time.

12. The portable computing device of claim 11, wherein the at least one function is contrast control.

13. The portable computing device of claim 11, wherein the at least one function is volume control.

14. The portable computing device of claim 11, wherein the at least one function is brightness control.

15. The portable computing device of claim 11, wherein the control circuit further includes an interrupt generator for generating an interrupt in response to engagement of the switch, the control circuit requesting a shift of one level for each interrupt generated.

16. The portable computing device of claim 15, wherein the control circuit further includes:
    a system management interrupt generator for generating continuous periodic system management interrupts, and
    a direction change counter, the direction change counter being decremented in accordance with the system management interrupts being generated; wherein the control circuit shifts from the first direction state to the second direction state upon the direction change counter being decremented to a predetermined value.

* * * * *